United States Patent [19]

Snedden et al.

[11] Patent Number: 4,520,450
[45] Date of Patent: May 28, 1985

[54] DIGITAL RAMP FUNCTION GENERATOR AND MOTOR DRIVE SYSTEM INCLUDING THE SAME

[75] Inventors: William H. Snedden, Newstead; Mohammed Safiuddin, Williamsville, both of N.Y.

[73] Assignee: Westinghouse Electric Corp., Pittsburgh, Pa.

[21] Appl. No.: 401,287

[22] Filed: Jul. 23, 1982

[51] Int. Cl.³ .......................... H03K 5/08; G06G 7/18
[52] U.S. Cl. .................................... 364/607; 364/718; 364/858; 318/7; 328/185; 307/228
[58] Field of Search .............. 364/469, 470, 471, 607, 364/718, 719, 722, 851, 857, 858; 318/6, 7; 307/263, 228, 490; 328/181, 185; 242/45, 75.45, 75.5, 75.51, 75.52, 75.53, 191

[56] References Cited

U.S. PATENT DOCUMENTS

| | | | |
|---|---|---|---|
| 3,530,386 | 9/1970 | Terry | 307/490 X |
| 3,686,639 | 8/1972 | Fletcher et al. | 340/172.5 |
| 3,944,989 | 3/1976 | Yamada | 340/172.5 |
| 3,976,981 | 8/1976 | Bowden | 340/172.5 |
| 4,016,496 | 4/1977 | Eastcott | 364/858 X |
| 4,023,902 | 5/1977 | Ungerman | 355/52 |

OTHER PUBLICATIONS

"Programmable Logic Controllers–Painless Programming to Replace the Relay Bank" by G. Lapidus in Controll Engineering, Apr. 1971, pp. 49–60.

Primary Examiner—Jerry Smith
Assistant Examiner—Allen MacDonald
Attorney, Agent, or Firm—C. M. Lorin

[57] ABSTRACT

A digital ramp function generator controls the speed of a motor drive system by initial contouring according to an arithmetic progression up to the intended ramp rate, and by final contouring according to the same arithmetic progression in reverse, thereby to reach the intended speed (by acceleration, or by deceleration). The digital ramp function generator is established at the intended ramp rate and contouring effects by a programmable controller programmed by the operator.

4 Claims, 20 Drawing Figures

DIGITAL RAMP FUNCTION GENERATOR AND MOTOR DRIVE SYSTEM INCLUDING THE SAME

CROSS-REFERENCE TO RELATED APPLICATIONS

Copending Patent Application Ser. No. 401,425, filed July 23, 1982, entitled "Digital Coil Diameter Function Generator and Reel Motor Drive System Embodying the Same", by B. S. Surana and W. N. Snedden.

Copending Patent Application Ser. No. 401,426, filed July 23, 1982, entitled "Digital Inertia Compensation Generator and Reel Motor Drive System Embodying the Same", by M. Safiuddin and B. S. Surana.

BACKGROUND OF THE INVENTION

The invention relates to ramp function generators, in general, and more specifically to a digital ramp function generator for accelerating and/or decelerating a motor drive.

Ramp function generators are important to accelerate, or decelerate, a motor drive from some initial speed to a terminal speed at a controlled rate. This is particularly useful in a rolling mill, in a paper mill, where a strip of material is being unwound from a pay-off reel and rewound on a delivery reel. The tension of the strip is to be maintained constant as a function of varying diameters on the reel, and the motor drives are automatically controlled in speed for that purpose. Accordingly, the rate of change of the speed, depending upon the size of the reels and the nature of the strip, has to be defined and set under varying circumstances by the operator. Moreover, in a rolling mill, where the strip is passed through processing roll stands, the stands are controlled in speed under a master reference with individual stand speed regulators maintaining constant mass flow between the pay-off reel and the delivery reel. In such a case, it is desirable to be able to adjust the speed rate individually at each stand as the overall process requires.

Acceleration of a motor drive was effected at an early stage of the prior art by a motor-operated rheostat. Later, magnetic amplifiers were used with the addition of large capacitors in a feedback loop to generate an integrating function. At the present time, a common approach is to use operational amplifiers to generate an integrating function. In such case, miniature motor-operated rheostats have been associated with the output, which are mounted on printed circuit cards. On the one hand, the motor-operated rheostat offers the advantage over the operational amplifier that, in the hold mode, it does not drift within the limits defined by the reference voltage applied to the rheostat elements. On the other hand, the operational amplifier allows more easily to change the rate of speed and provide rounding in the change of speed at the start, or before a stop. However, operational amplifiers are subject to drift.

SUMMARY OF THE INVENTION

It is now proposed to take advantage of modern digital technology for the generation of a ramp and to apply it to a motor drive, thereby to eliminate the aforementioned drawbacks of the prior art.

The invention resides in providing a ladder-diagram programmable-controller logically establishing a ramp function between a reference input and a reference output for applying to the speed regulator of a motor drive the desired speed reference for acceleration, or deceleration, at a programmed rate of change of speed.

The ladder diagram according to the invention can be adjusted for a selected ramp slope and for establishing a predetermined rate of change at the start and/or at the end of the ramp.

Provision is also made for selecting between normal run ramp rate, normal stop ramp rate and an emergency stop ramp rate.

The ladder diagram further provides for the automatic calculation of the rate of speed derived at the output for any given rate of integration selected, as well as for a definite rounding effect during start and/or stop of the ramp.

DESCRIPTION OF THE PREFERRED EMBODIMENT

The invention will now be described in the context of a NUMA-LOGIC 700 Series Programmable Controller currently on the open market and advertised by Westinghouse Electric Corporation, NUMA-LOGIC Department, 32031 Howard Street, Madison Heights, Mich. 48071.

Figure 1:
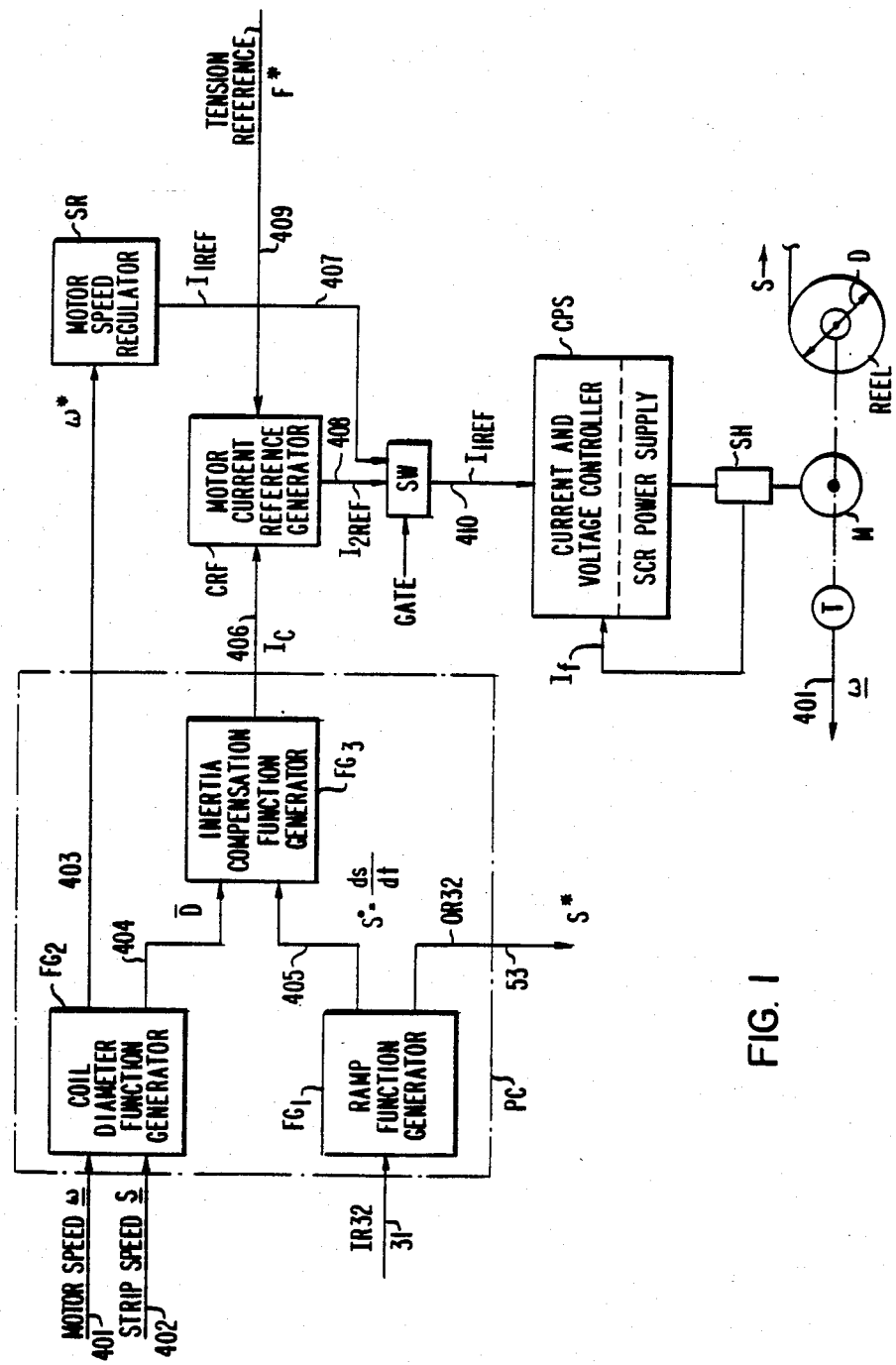
FIG. 1 is a block diagram illustrating a programmable controller including the function generator according to the invention.

Referring to FIG. 1, a reel drive control system is illustrated embodying a programmable controller including three function generators, $FG_1$, $FG_2$ and $FG_3$.

Function generator $FG_1$ is a ramp function generator according to the present invention. It is used for the generation of a reference strip velocity signal $S^*$ and a signal $S_. = ds/dt$ representative of the derivative thereof.

Function generator $FG_2$ is a coil diameter calculation function generator used for the generation of a signal representing the instantaneous normalized diameter of the coil on the reel $\overline{D}$, and a motor speed reference signal $\omega^*$ to be applied to the motor speed regulator SR of the reel drive system. Function generator $FG_2$ is fully described in copending patent application Ser. No. 401,425, filed July 23, 1982, concurrently with the present application by B. S. Surana and W. H. Snedden.

Function generator $FG_3$ is an inertia compensation function generator used to generate during aceleration and/or deceleration a compensating current $I_c$ for the motor current reference generator CRF of the reel system. Function generator FG$_3$ is fully described in copending patent application Ser. No. 401,426, filed July 23, 1982 concurrently with the present application by M. Safiuddin and B. S. Surana.

The two afore-mentioned copending patent applications are hereby incorporated by reference.

Figure 2:
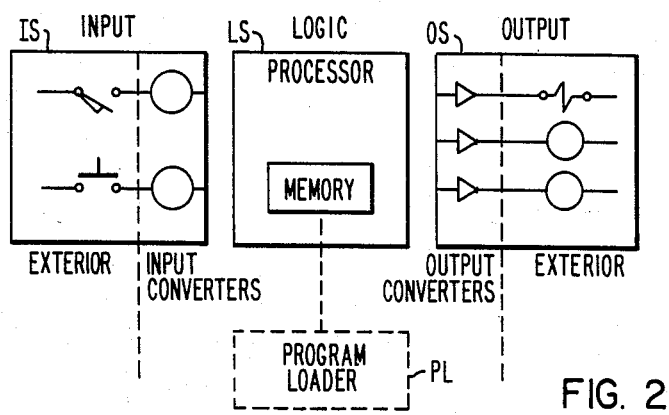
FIGS. 2 to 10 are illustrations of prior art circuitry representing portions of a programmable controller of the ladder-diagram type as can be used in implementing the present invention.

Referring to FIG. 2 the 700 Series Programmable Controller (PC-700) is schematically represented as including an input section (IS), a logic section (LS) and an output section (OS). The logic section includes a processor and a memory under control of a program loader (PL).

The input section (IS), typically, includes a plurality of modules associated either with a discrete input, or with an analog input. In a motor drive system the discrete inputs may be ON/OFF for RUN, START, STOP, ACCELERATE, INCH, ... supplied by pushbuttons, switches, contacts, etc. The individual signal is converted by the input circuit of the associated discrete input module to a proper processor voltage representing a ONE, or ZERO.

The analog input, which in a motor drive may be a feedback armature speed signal; a tension reference signal set point, ... is converted by the associated circuit of the analog input module to a byte representation stored in a register at processor voltages, e.g., ZERO's and ONE's. The multi-bit signals supplied by thumbwheels, instrumentation, are converted by the module to processor voltages. Typically, a multiplexed register input module allows to process up to sixteen 4-digit BCD numbers. Whereas, a single-point register accepts only a single 16-bit number. Typically, all register input modules accept 5 volts TTL signals and have the equivalent height of two discrete modules.

The output section is similar to the input section but conversion is effected in the opposite direction. Each output circuit converts a processor signal to the voltage and current levels required by individual output devices, such as motor starters, solenoids and pilot lights. Analog output circuits convert multi-bit register information at processor voltages to the analog levels required by the associated instrumentation. For instance, the outputted signal may be in a range from 0 through 10 volts, of 4 through 20 milliamperes. Again, register output module circuits are provided to convert 16-bit register data at processor voltages to the 5 volts TTL levels typically required for instrumentation and readouts. Single register output circuits are provided, as well as multiplexed register output modules where group readouts are required.

Figure 3:
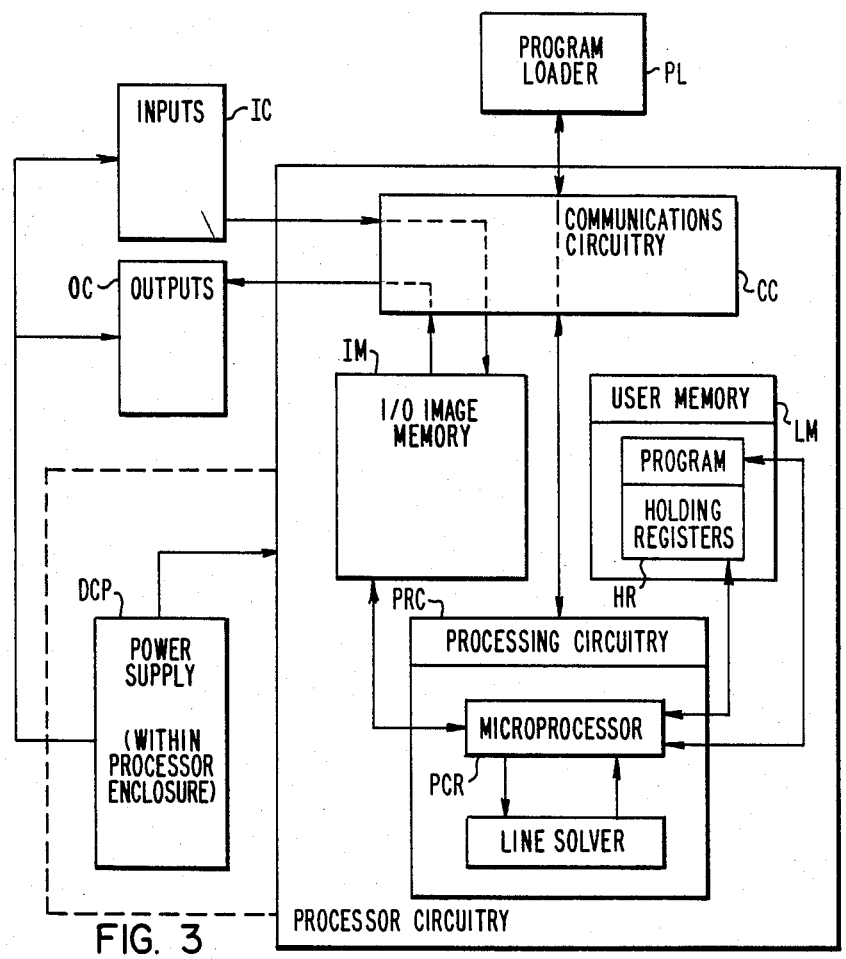

Referring to FIG. 3, the processor, in the processor section (PS), coordinates the operation of the total PC-700 control system. It includes a ladder memory (LM) containing instructions programmed by the program loader (PL).

The programmable logic controller is well known. See for instance "Programmable Logic Controllers-Painless Programming to Replace the Relay Bank" by G. Lapidus in Control Engineering, April 1971, pp. 49-60. Its application as a controller for machine equipment may be typified by U.S. Pat. Nos. 4,023,902; 3,976,981; 3,944,989; and 3,686,639. This prior art is illustrative of "a ladder program, logic diagram, or boolean equations that specify a control sequence" to be entered directly into the controller by the operator on the program loader "pressing the appropriate buttons on a programming panel, or by writing instructions from a simple application-oriented instruction set" (Lapidus page 49 column 2). Accordingly, a technician not familiar with programming techniques will be able to establish with the programmable logic controller the internal logic required for the particular application. This is achieved by developing a ladder diagram simulating between an input line and an output line a succession of parallel circuits activated in a scanning order one at a time, each circuit involving a relay coil and associated contacts which determine, when the relay is activated or deactivated, the electrical connection via contacts for a subsequent logic step through a subsequent circuit.

The ladder memory (LM) of FIG. 3 serves as the storage location for any holding register values (HR) required under the program. The I/O image memory (IM) of FIG. 2 contains the status of all the input circuits at the beginning of each scan of the ladder diagram sequence, and stores the newly determined coil and output register states upon each step of the ladder reached during the scan.

The processing circuitry simulating actual logic through the processor section is established with the program loader by the operator so as to construct, contact-by-contact, each circuit in the ladder diagram according to the program. The selected contacts are used to determine whether the circuit is conducting. When a coil is controlled by the associated circuit becoming conductive or non-conductive, the coil determines the state of its contacts depending upon whether they are normally open, or normally closed contacts. The state of the coil is stored in the I/O image memory according to the newly determined state of the circuit. At the beginning of each scan of the ladder, the states of the input circuits are transferred to the I/O image memory by the communications circuitry (CC). At the end of each scan of the ladder, the communications circuitry (CC) transfers the output states stored in the I/O image memory to the output circuits. The communications circuitry also transfers the instruction from the program loader (PL) to the processor.

Figure 4:
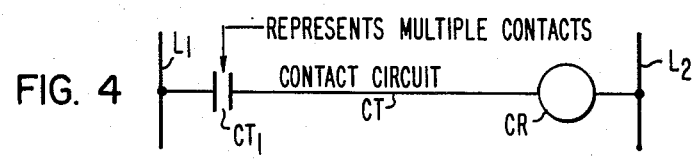

DC power is provided to operate the processor, and the input and output circuits. Referring to FIG. 4, an elementary control relay coil (CR) is connected in circuit by line CT with normally open contacts CT$_1$ between L$_1$ and L$_2$ the input and output lines of the ladder, respectively.

Figure 5:
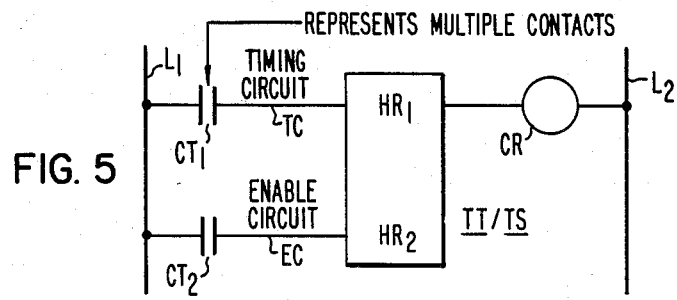

Referring to FIG. 5, circuit control timer (TT/TS) is illustrated including a preset value registered in a holding register HR$_1$ (of the I/O image memory) and a destination holding register HR$_2$. A timing circuit (TC) with contacts CT$_1$ and an enable circuit (EC) with contacts CT$_2$ are associated with the holding registers HR$_1$ and HR$_2$, respectively. The timer, a local clock, is allowed to run only when the timing circuit is conducting. When the timer is running, increments of time in digital representation are counted. Accumulated time is stored in the destination HR$_2$, and the associated coil will be energized and its contacts (typically CT$_1$) will be operated when the actual value of HR$_2$ equals the present value of HR$_1$. The timer will retain the accumulated value on HR$_2$ as long as contacts CT$_1$ of the enable circuit are closed. When the enable circuit is not conducting, the timer is reset and HR$_2$ is held back to zero, as well as HR$_1$. The preset value of HR$_1$ may be programmed as a constant along with the timer, or it may come from an input register IR, another holding register HR, or an output register OR, so that its value may be varied.

Thus, the I/O image memory contains representations stored which correspond to an input register IR, or an output register OR, as well as a hold register HR.

Similar teachings are used to represent an add or a subtract function, a divide or a multiply function, a comparison function, which are all to be used in the implementation of the present invention.

Figure 6:
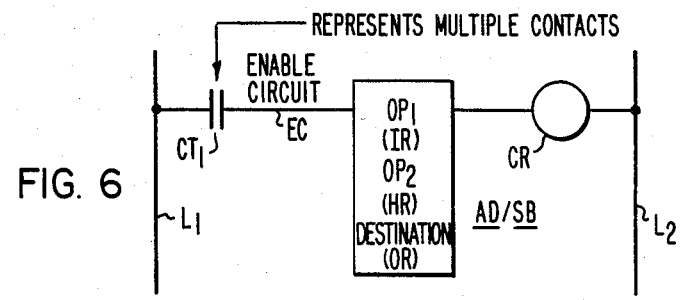

FIG. 6 illustrates the ADD or SUBTRACT function, (AD/SB), including an enable circuit EC having normally open controlling contacts $CT_1$ controlled by the scanning process. Operand $OP_1$ comes from an input register IR (but it may come as well from an output register, or a holding register). Operand $OP_2$ comes from a holding register HR as shown (but it may come as well from an input register, an output register, or it can be a constant value set in the system). The result of the operation is placed in a destination register which is shown as an output register OR, but may be as well a holding register. Typically, the PC-700 allows 4-digit decimal numbers (up to 9999) to be added or subtracted producing a 4-digit decimal result. The addition or subtraction is performed when the enable circuit changes from a non-conducting to a conducting state.

To add, $OP_1$ is added to $OP_2$ and the result placed in destination register OR. If the result is greater than 9999, the coil CR is energized and the amount of overflow (greater than 10,000) is placed in the destination register OR. The coil is energized only if the result exceeds 9999.

To subtract, $OP_2$ is subtracted from $OP_1$, and the result is placed in the destination register (OR in FIG. 5). If the result is less than zero, the coil is energized and this new coil status is stored in memory, thereby to indicate the sign of the error for whatever intended purpose in the system. The amount of under flow (less than 0000) is placed in the destination register OR.

In either case, when the enable circuit EC is not conducting, the coil is deenergized. When the coil is forced, only its contacts (and output circuit if any) are affected; the function continues to operate according to the enable circuit EC.

Figure 7:
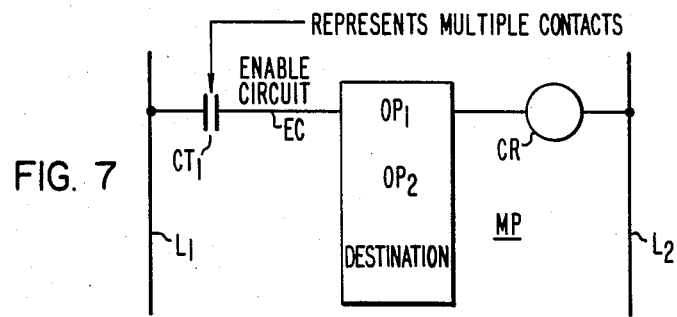

FIG. 7 illustrates the multiply function MP. Two 4-digit decimal numbers (up to 9999) to be multiplied produce up to eight decimal digits. The two numbers are multiplied only when the enable circuit EC changes from non-conducting to a conducting state (by contacts $CT_1$ in FIG. 7). Operand $OP_1$ may come from an input register, an output register or a holding register. Operand $OP_2$ may come from an input register, an output register, a holding register. It may also be a programmed constant. $OP_1$ and $OP_2$ are stored in binary form (after conversion if the number is in BCD form). The CR coil is energized when the enable circuit EC, through contacts $CT_1$ (as illustrated), is conducting and, conversely, CR is deenergized when EC is not conducting. Forcing the CR coil affects only the associated contacts (and output circuit if any). The CR function continues to operate according to the enable circuit EC. The result of the multiplication is placed in a pair of registers (holding, output, or destination register).

Figure 8:
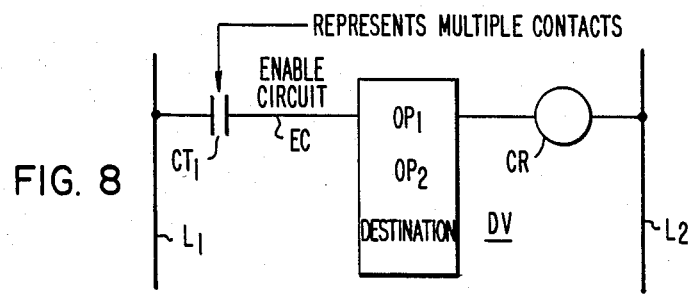

The divide function (DV) is illustrated in FIG. 8. Operand $OP_1$ is divided by operand $OP_2$. $OP_1$ could be an 8-digit decimal number and $OP_2$ a 4-digit decimal number. The result can be up to four digits in this example. $OP_1$ is divided by $OP_2$ when conducting. $OP_1$ comes from a pair of registers (input, output or holding register). The result is placed in a pair of registers (output, holding register) serving as destination registers; the first containing the result, the second containing the remainder.

The CR coil is energized if $OP_2$ equals zero or if the result is greater than 9999 (in the example). The coil is deenergized when the enable circuit EC is not conducting. Forcing the CR coil affects only the associated contacts; the CR function continues to operate according to the enable circuit EC.

Figure 9:
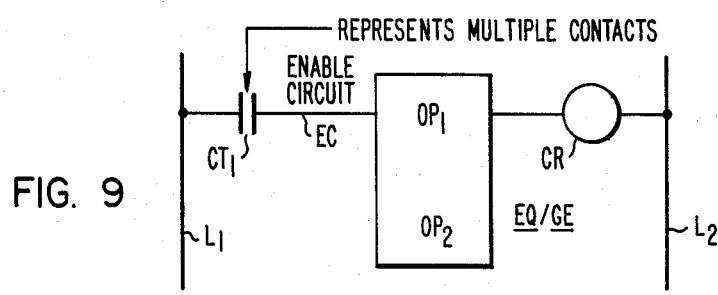

The comparison function EO/GE is illustrated by FIG. 9. Two operands $OP_1$, $\overline{OP_2}$ are compared when the enable circuit EC conducts. If the EQUAL function is intended between $OP_1$ and $OP_2$, when the enable circuit EC is conducting and $OP_1$ is equal to $OP_2$, coil CR will be energized. If $OP_1$ is not equal to $OP_2$, or if the enable circuit EC is not conducting, the coil will be deenergized.

If the comparison function is intended to establish the relationship larger than, or smaller than, between $OP_1$ and $OP_2$, choosing energization of the coil CR when the condition is fulfilled and the enable circuit is conducting, will achieve the result.

Figure 10:
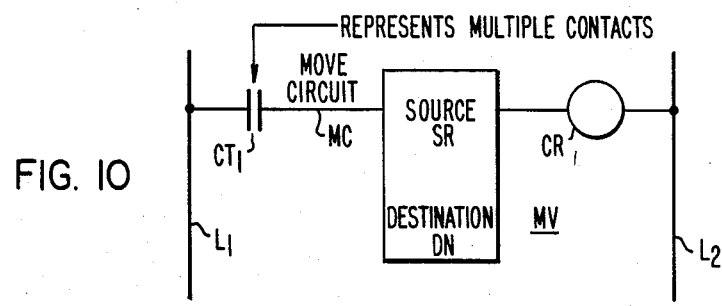

Referring to FIG. 10, the move function is illustrated by block MV associated with a coil CR and contacts $CT_1$. When the move circuit MC is conducting, data is transferred from the source SR to the destination DN. The source may be a holding register, an input register, an output register, an input or an output group. The destination may be a holding register, an output register, or an output group. Such move occurs on each processor scan, and the coil is energized.

Figure 11:
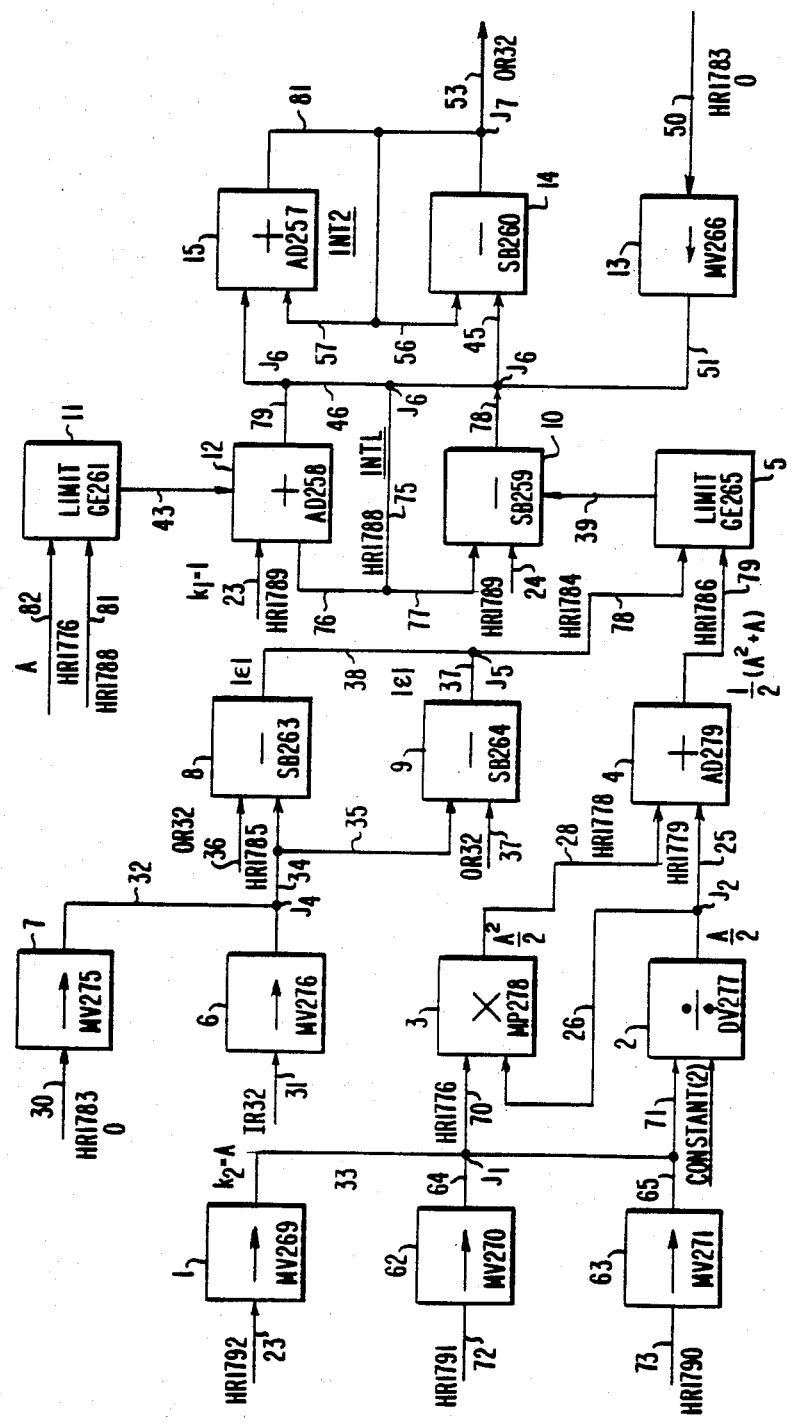
FIG. 11 is a block diagram representation of the ramp function generator according to the present invention.

Referring to FIG. 11, a ramp function generator used for establishing a reference speed in a motor drive system (and a reference strip velocity $\underline{S}$ in a reel system) is illustrated in block diagram combining several of the functions shown individually by FIGS. 4 to 10.

In input register IR32 is used to establish a reference level (identified by IR32 and input line 31 to $FG_1$ in FIG. 1) to which the ramp output (identified by OR32 and output line 53 of $FG_1$ in FIG. 1) output register should be brought as a final value. The reference of line 31 is applied to block 6 FIG. 11 which represents a move function MV276 passing the value of line 31 to line 34 when energized. The input register IR32 receives a value between zero and 10 volts corresponding to a 4-digit decimal number from zero to 4095. An output register OR32 (line 53) is used to output a 4-digit digital number to be converted by an A/D converter to a voltage from zero to 10 volts when the accumulated count has reached a value between zero and 4095.

Figure 12:
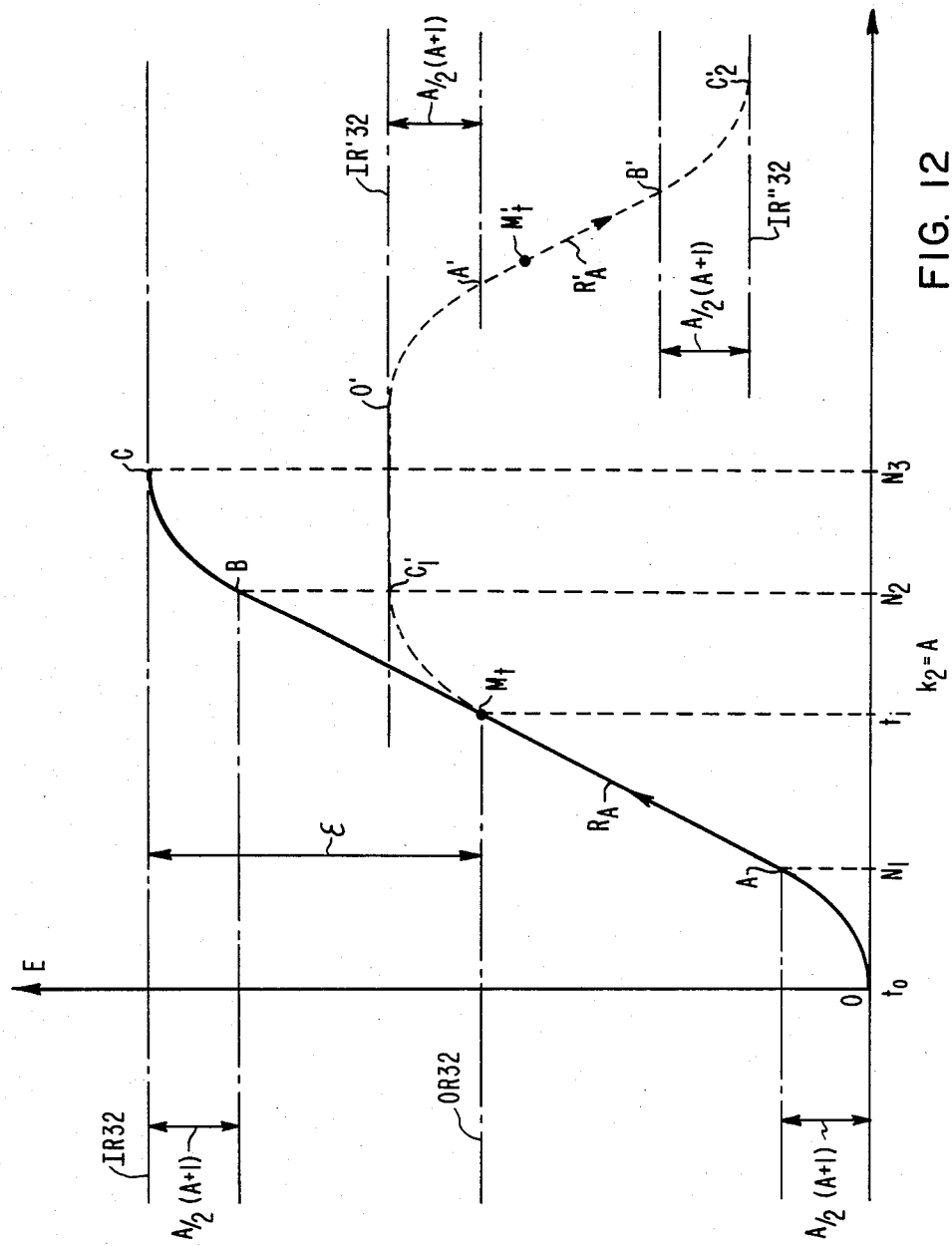
FIG. 12 illustrates with curves ramps as can be generated in accordance with the invention.
Figure 13A:
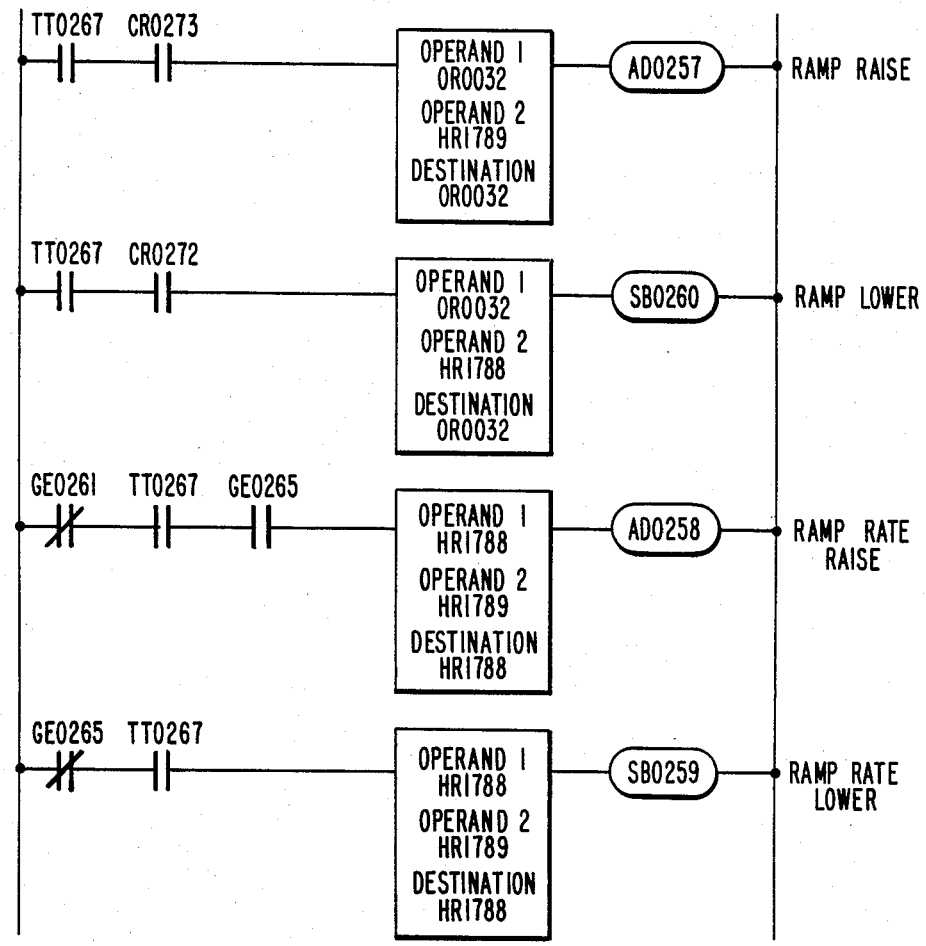
FIGS. 13A to 13E illustrate by a ladder diagram the operation of the programmable controller according to the invention.
Figure 13B:
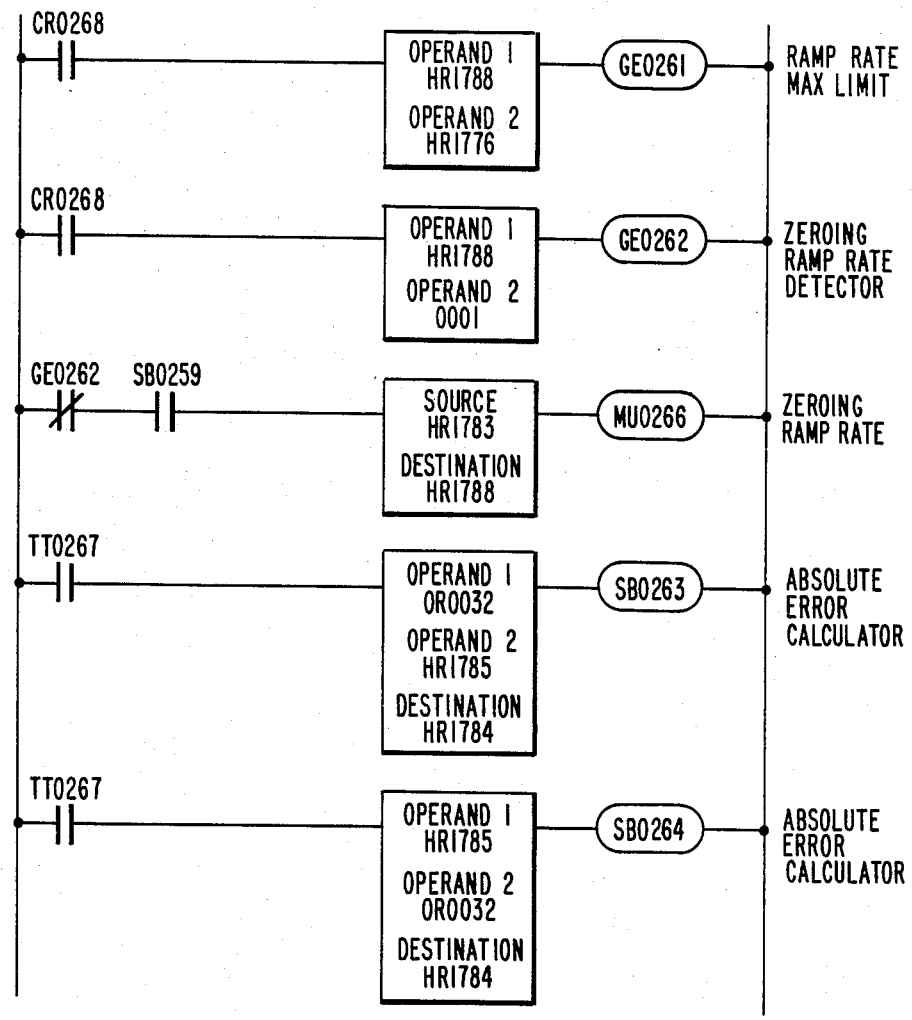
Figure 13C:
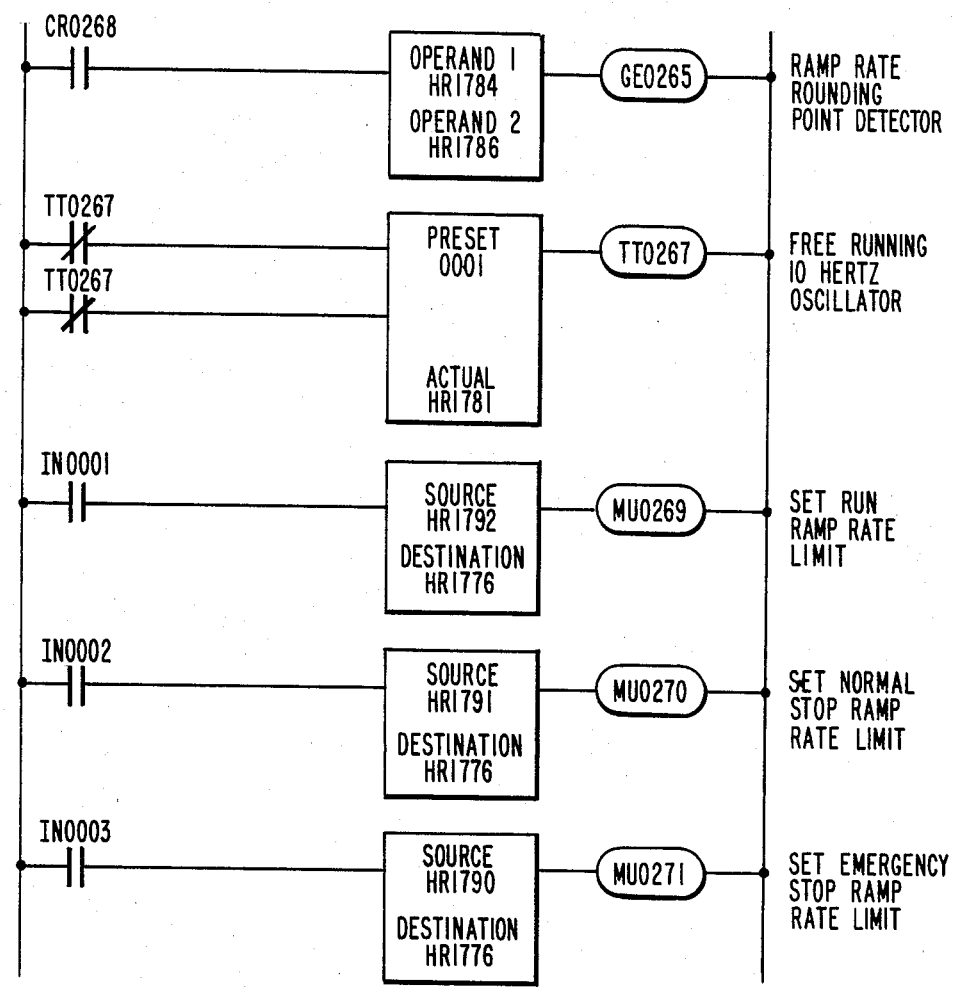
Figure 13D:
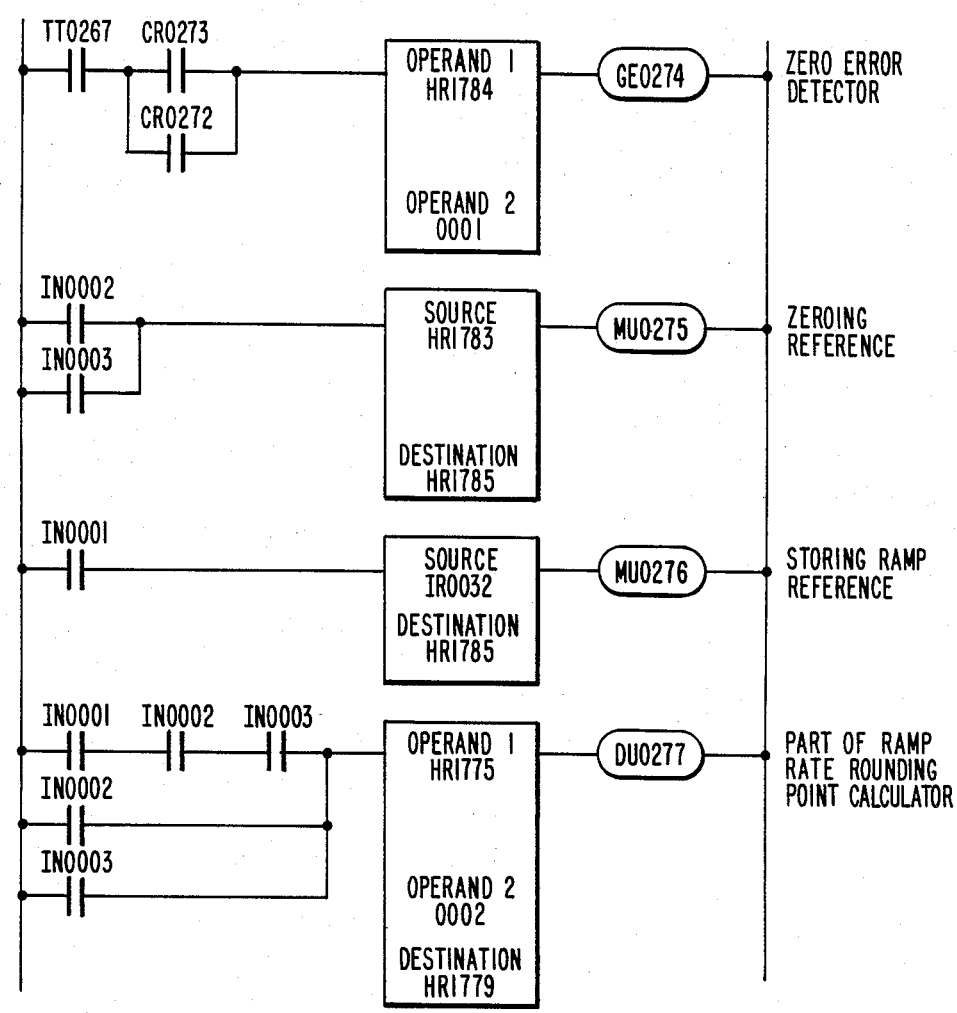
Figure 13E:
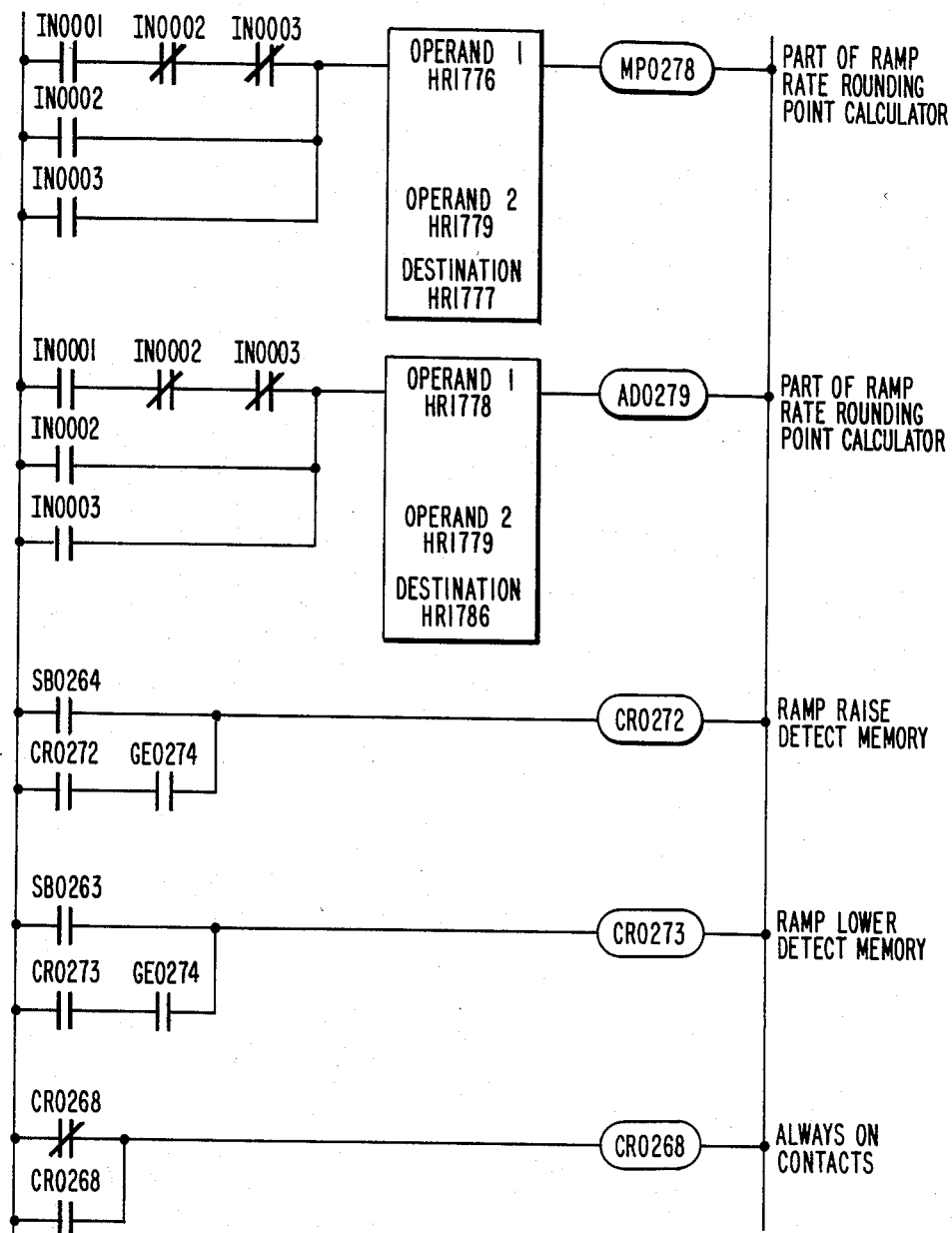

At the upper right corner of FIG. 11, circuitry is shown relative to the ramp function generation onto output line 53 (OR32). The ramp rate, or increment per second, is built up from zero initially, as illustrated in FIG. 12 by position 0 of a ramp $R_A$ including a straight slope portion AB (slope $k_2 = A$) extending between an initial contouring portion OA and a final contouring portion BC, while reaching a reference level of speed E prescribed by input register IR32 on line 31. To this effect, a first integrator INT1 including an adder (AD258) provides at its output (line 79 and junction $J_6$) an incremented amount stored in holding register 1788 (line 75) which is inputted as operand on line 76 together with an increment $k_1$, at input 23 (HR1789), as the second operand. For the purpose of illustration, the increment is $k_1 = 1$. At junction $J_6$, HR1788 is set at zero value by a move function MV266 (block 13) from line 50 and HR1783. Accordingly, at junction J$_6$, HR1788 increases from zero its contents by one until the value k$_2$=A is reached (position A). While scanning of the ladder diagram, typically, is of the order of 50 milliseconds, the integrator, typically, is operating at a rate of T=1/10 of a second per increment. When the intended rate k$_2$=A has been reached, adder 12 is controlled from comparator 11 by line 43 to stop incrementing, as explained hereinafter. It is observed at this point that upon each time interval T=1/10 sec., the value existing at junction J$_6$ is inputted as operand on line 46 into another adder 15 (AD257). Adder 15 is in fact operating as a second integrator INT2 connected in cascade behind INT1. The output thereof, on line 81 and junction J$_4$, is stored into output register OR32 (line 53), the contents of which are also used as a second operand from junction J$_7$, via line 57, into adder 15. Therefore, after a first time interval T=1/10 sec. (from position 0 on the curve of FIG. 12) INT2 will generate within OR32 the value zero+1 received from line 23 through J$_6$. At a second time interval T the contents of OR32 will be raised to 2+1 from the new value 2 at J$_6$ through adder 15. Then, at a third time interval T the contents of OR32 will reach 3+3, and so on, whereby the operative point will progressively reach position A on the curve of FIG. 12 through a contour, the increasing slope of which follows an arithmetic progression of root k$_1$=1 defined by line 23 and integrator INT1. After N$_1$ time intervals T, the slope will have reached the intended value, with k$_2$=N$_1$k$_1$=A (in the example).

More generally, from an instant corresponding to time interval (n−1)T of rank (n−1) to a time interval nT of rank n, the progression on the ordinate of the curve of FIG. 12 is given by the relation:

$$E(nT)=E(n-1)T+nk_1, \quad (1)$$

where n=1,2, ... N$_1$, successively from position 0 to position A on the curve, and N$_1$ is the number of time intervals T required to go from 0 to A, e.g., from slope zero to slope k$_2$ (A in the example).

Once at the intended slope k$_2$ (position A), the progression becomes linear as follows:

$$E(nt)=E(n-1)T+k_2=E(N_1T)+k_2 \quad (2)$$

with n=(N$_1$+1), (N$_1$+2), ... N$_2$, successively from position A to position B on the curve R$_A$. (k$_2$=A in FIG. 12, and N$_2$ is the total number of time intervals T to go from 0 to B). The following relation exists:

$$(N_2-N_1) = \left(\frac{IR32}{k_2} - k_2 - 1\right).$$

Again, from B to C, contouring is required to reach the final level, e.g. for which OR32=IR32 e.g. the reference level of line 31. For this second, or final contouring, the following relation exists:

$$E(nT)=E(n-1)T+[k_2-(n-N_2)k_1] \quad (3)$$

where n=(N$_2$+1), (N$_2$+1), (N$_2$+2), ... , N$_3$, successively, with (N$_3$−N$_2$)=N$_1$.

Accordingly, the method of incrementing the output of a ramp generator for speed control which is proposed in accordance with the present invention, establishes from an initial level an initial contouring portion followed by a ramp portion and terminated by another contouring position to the final reference level. Moreover, the two opposite contouring portions are equal, although of opposite concavities. FIG. 12 shows a process of acceleration, e.g. a positive ramp. The same process can be followed for deceleration, as exemplified by a curve 0'A'B'C'$_2$ which is caused to occur after the operative point M$_t$ has been chosen to initiate contouring to C'$_1$ with a reference level IR'32, rather than IR32. After maintaining the level E of C'$_1$ until the instant marked by operative point 0' for initialization of the ramp, an increase of slope has brought the operative point (OR32) down to A', then, along a straight ramp to B', and from B' to a zero slope level marked by C'$_2$, which is thereafter maintained in accordance with an intended lower reference level IR''32.

Referring again to FIG. 11, the portion 0A of ramp R$_A$ of FIG. 12 has been shown to be followed while adder 12 (INT) is adding k$_1$=1 from line 23 and holding register HR1789. It remains to be shown when will the operative point M$_t$ come to follow the linear portion AB. In this regard, it is observed that integrator INT1 by building an arithmetic progression at junction J$_6$ during N$_1$ time intervals T, totalizes in fact an ordinate value which is 1+2+3 ... N$_1$=N$_1$/2(N$_1$+1). More generally, if the arithmetic progression has a root k$_1$, the final slope at position A is k$_2$=N$_1$k$_1$, and the level reached from 0 to A is at the ordinate (k$_2$+1)·k$_2$/2. Therefore, with an intended ramp R$_A$ of a slope k$_2$=A, the value accumulated in OR2 for position A is a predetermined value (A+1)·A/2. The same observation can be made for position B where contouring is to be initiated by slope reduction. The value of OR2 when such contouring should begin is situated a predetermined value, the same (k$_2$+1)·k$_2$/2, or rather (A+1)·A/2, away from the intended level IR32, since contouring by reduction of slope from B to C is also effected by a logarithmic program in which the slope k$_2$=A is arithmetically reduced by the amount k$_1$.

In the case of FIG. 11, k$_1$=1 and to reduce the slope such value stored in holding register HR1789 is now applied as operand to a subtractor 10 (SB259) which operates by the same process, but negatively in regard to junction J$_6$, from which the other operand is derived e.g. from line 75 and holding register 1788 to be fed by line 77 into subtractor 10 (SB259). When contouring is initiated at position B, the ramp value is k$_2$ as stored in HR1788 and as it appears at junction J$_6$. At position C (OR32) subtractor 10 is gated by comparator 5 from line 39, as explained hereinafter. Assuming, as before, that k$_1$=1 (on line 24), the slope is being reduced by one upon each following time interval T. This occurs (N$_3$−N$_2$) times (as shown by FIG. 12) until the value A−(N$_3$ N$_2$)k$_1$ at junction J$_6$ has been reached, e.g. zero slope. By that time integrator INT2 outputs on line 53 a value for OR32 which is equal to the intended level IR32. Regarding the second integrator INT2, it has been assumed so far that during acceleration M$_t$ was going from level zero (position 0 on the curve of FIG. 12) to a higher level IR32, and that the second integrator INT2 was operating with adder AD257 (block 15) to increase the accumulated amount of OR32 from zero to the level E=IR32.

If deceleration is intended, namely with a level E (IR32) to be reached which is lower than the initial level of speed, for instance as shown from 0' to IR''32 in FIG. 12, the second integrator INT2 is operating with subtractor SB260 (block 14). The level of OR32 at J$_7$ used as operand on line 56 is the minuend, and the level at junction J₆ from line 45 is the subtrahend.

It will be now shown how the circuit of FIG. 11 provides for gating adder 12 when initially increasing the ramp rate from zero slope (to, initially accelerate from position 0, or to decelerate initially from 0'), or for gating subtractor 10 when contouring toward a zero slope (by accelerating with a decreased rate toward the final level IR32 along BC, or when decelerating with a decreased rate toward the final level IR''32 along B'C'₂).

Assuming a normal rate $k_2 = A$ intended for ramp $R_A$ of FIG. 12, this value is stored into holding register HR1792 (line 23) and moved by move function MV269 (block 1) onto line 33 and junction J₁, where it is stored in holding register HR1776. From there, $k_2 = A$ is divided by 2 in divider DV277 (block 2) to output $k_2/2$ at junction J₂ on line 25 and in holding register HR1779. The value in HR1779 is multiplied, via line 26, in multiple function MP278 (block 3) by $k_2$ from HR1776 to provide $\frac{1}{2}k_2^2$ on line 28 and in HR1778. Adder AD279 (block 40) combines lines 25 and 28 to provide on line 79 (in holding register HR1786) the arithmetic progression summation $\frac{1}{2}k_2(k_2+1)$.

First, regarding the gate signal of line 43 into adder AD258 (block 12), this signal is derived from a greater or equal function GE261 (block 11) which has a limit for comparison defined by the rate to be reached through portion AB (FIG. 12). To this effect, holding register HR1776 (line 82) contains the value of $k_2$ (equal to A for ramp $R_A$). The increasing ramp rate, known from junction J₆ and stored in HR1788, is applied to block 11 by line 81. When the contour reaches the ramp value of line 82, block 11 controls by line 43 adder AD258 to stop incrementing. Thereafter, the ramp rate being established, integrator INT2 (adder AD257 of block 15) operates alone to increase OR32 at a constant rate $k_2$ (A in FIG. 12).

Secondly, regarding the initiation of the second contouring portion (BC, or B'C'₂, on FIG. 12) and the gating signal of line 39 into subtractor 10 (SB259), this signal is derived from a greater or equal function GE265 (block 5) which has a limit for comparison set in HR1786 (line 79) which is equal to $\frac{1}{2}k_2(k_2+2)$ e.g. $\frac{1}{2}A(A+1)$ in FIG. 12. When the absolute error $|\epsilon|$, or distance of $M_t$ from IR32 (line 78) becomes equal to $\frac{1}{2}k_2^2+\frac{1}{2}k_2$ (the limit on line 79), block 5 (GE265) causes by line 39 subtractor 10 to start decreasing the ramp rate, thereby initiating contouring (from B to C) and we know that at zero slope $M_t$ will have reached the level of IR32. The same can be said regarding contouring at B'.

In order to choose between acceleration (OR32 increasing), or deceleration (OR32 decreasing), it remains to determine whether $M_t$ (OR32) lies below the level of the reference, namely IR32 on line 31, or above the reference level IR32, or even the zero level on line 30 (HR1783). To this effect, move function MV275 (block 7) for the zero level, or move function MV276 (block 6) for the IR32 level, apply at junction J₄ the reference level which is compared, in either of two subtractors 8(SB263) and 9(SB264), with the level E of $M_t$ (OR32). One subtractor SB263 uses OR32 on line 36 as minuend and HR1785 of line 34 as subtrahend, namely when OR32 is above (deceleration). The other subtractor SB264 uses OR32 on line 37 as subtrahend and HR1785 of line 32 as minuend, namely when OR32 is below (acceleration). In the illustration of FIG. 11, both subtractors generate at junction J₅ the absolute error $|\epsilon|$ which tells how far $M_t$ is from its goal IR32 (or zero level). Regarding subtractors 8 and 9, as explained earlier by reference to FIG. 6, when the result is less than zero in a subtractor the coil becomes energized and the coil status is stored in memory. Therefore, an indication of the sign is retained to indicate which one of the two situations exists: OR32 above, or OR32 below. This sign derivation (not shown, but understood) determines whether in the second integrator INT2, adder 15 will be operative (acceleration) or subtractor 14 (deceleration).

The block diagram of FIG. 11 also provides at junction J₁ for either of three possible ramp rates to be selected from. One ramp rate in HR1792 (block 1) is the normal rate for acceleration. The second ramp rate in holding register HR1791 (block 62) may be used for normal deceleration. The third ramp rate in holding register HR1790 (block 63) is the ramp rate that may be required for an emergency stop.

Referring to FIGS. 13A to 13E, the ladder diagram as it appears before the key operator facing the program loader corresponds to FIG. 11. The same reference is used to indicate a holding register, an output register, an input register, a destination register or a source register, as the case may be. Line-per-line, during scanning of the ladder, FIGS. 13A–13E have the following correspondency to FIG. 11:

| Lines: | FIG. 11 | Explanation |
|---|---|---|
| (FIG. 13A) | | |
| 1 | adder 15 | ramp raise |
| 2 | subtractor 14 | ramp lower |
| 3 | adder 12 | ramp rate raise |
| 4 | subtractor 10 | ramp rate lower |
| (FIG. 13B) | | |
| 1 | comparator 11 | ramp rate maximum limit |
| 2 | (not shown) | zeroing ramp rate detector |
| 3 | (not shown) | zeroing ramp rate |
| 4 | block 8 (above); block 9 (below) | absolute error calculator |
| Lines: (FIG. 13C) | FIG. 10 | |
| 1 | block 5 | ramp rate rounding point detector |
| 2 | T = 1/10 sec. | free running 10 Hz oscillator |
| 3 | 1 | set run ramp rate limit |
| 4 | 62 | set normal stop ramp rate limit |
| 5 | 63 | set emergency stop ramp rate limit |
| (FIG. 13D) | | |
| 1 | (not shown) | zero error detection |
| 2 | 30, 7, 32, J₄ | zeroing reference |
| 3 | 31, 6, J₄ | storing ramp reference |
| 4 | J₁, 2, J₂ | ramp rate rounding calculation |
| (FIG. 13E) | | |
| 1 | 70, 26, 3, 28 | ramp rate rounding point calculation |
| 2 | 25, 28, 4, 79 | ramp rate rounding point calculation |
| 3 | 8 | ramp rate detect memory |
| 4 | 9 | ramp lower detect memory |
| 5 | (not shown) | always ON contacts |

Referring again to the afore-mentioned equations (1), (2) and (3) relative to the calculation of the first (0A), second (AB) and third (BC) segments of the ramp of FIG. 12, practical considerations are to be borne in mind.

The contour should not last more than 2 seconds, typically. Therefore, with each increment being added, or subtracted for 1/10 sec., the number $N_1$ of the first segment, or $(N_3-N_2)$ of the third segment, should be less than 20. On the other hand, since $k_2=N_1 \cdot k_1$, if $k_2$ is chosen too large for a given $k_1$, the value $N_1$ might exceed such practical limit (given for illustration of 20). Accordingly, a value of $k_1$ will be chosen large enough to reduce within $k_2$, the amount of $N_1$. With $k_1=1$ as in the illustration of HR1789 in FIG. 11, $k_2$ should be less than or equal to 20 times $k_1$. The general formula for the first segment (0A on FIG. 12) is $k_2/k_1 \leq N_1 \leq 20$ with $k_1=1$ for ramp times $t \geq 20$ sec. and $k_1=k_2/20$ for ramp times $\geq 20$ sec.

It is also observed, regarding the straight portion AB, that $E(nT)$ should become larger than $\frac{1}{2}k_2(k_2+1)$ in order that Mt (OR32) be above the level of A on the curve of FIG. 12, and that Mt (OR32) must be at some time below the level of B, e.g. IR32 $-\frac{1}{2}k_2(k_2+1)$. The general condition to have a straight ramp portion is, therefore, $$\tfrac{1}{2}k_2(k_2+1) < E(nT) < E(\mathrm{IR32}) - \tfrac{1}{2}k_2(k_2+1)$$

Figure 14:
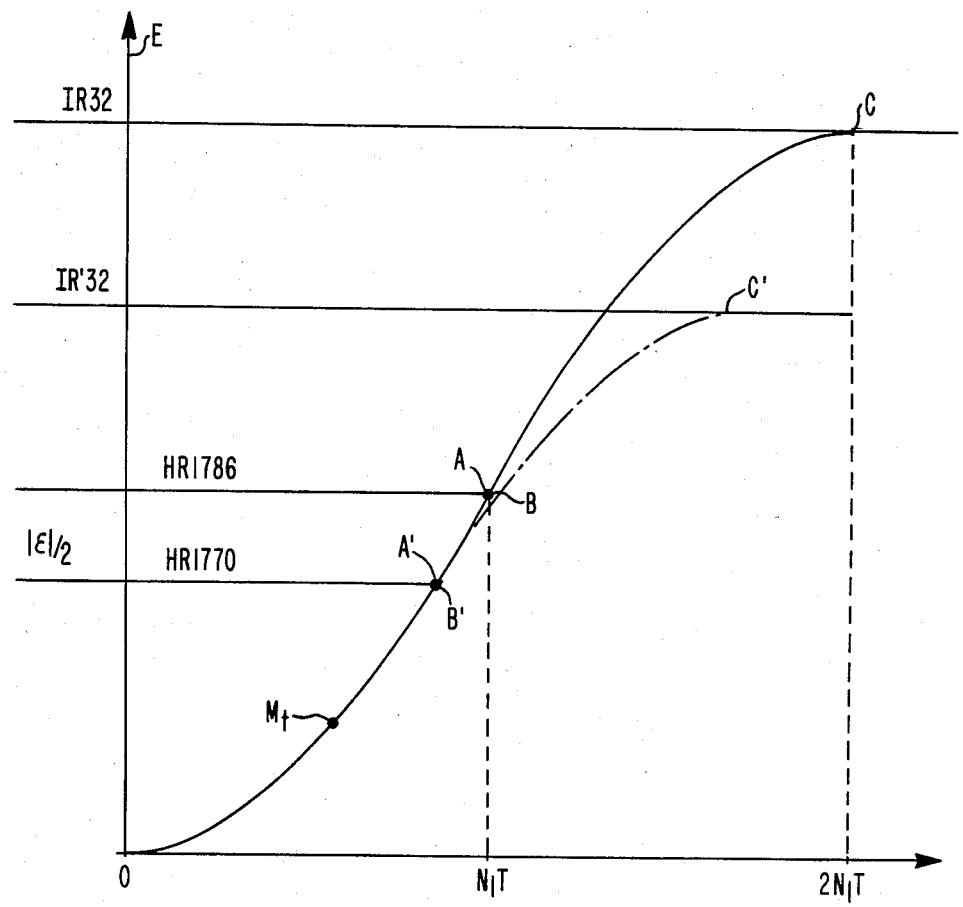
FIG. 14 illustrates with curves two different modes of operation of the ramp function generator according to the invention.

Another consideration is the fact that when initiating a ramp toward a final level E, given by IR32 (FIG. 12), the distance from the initial level may be equal or less than twice the value $\frac{1}{2}(k_2^2+k_2)$, e.g. the increase (OR2) by the second integrator INT2 by two contouring processes. Therefore, as shown by FIG. 14, the operating point Mt (OR32) on the ramp may either go to IR32 by following 0A, then BC, with no straight portion AB at all, or else it may go from 0 to A' along an incomplete contouring segment, then start another incomplete contouring segment of opposite concavity, toward the reference (IR'32). The circuit of FIG. 11 has been modified as shown in FIG. 15 in order to take into account these two possibilities.

Figure 15:
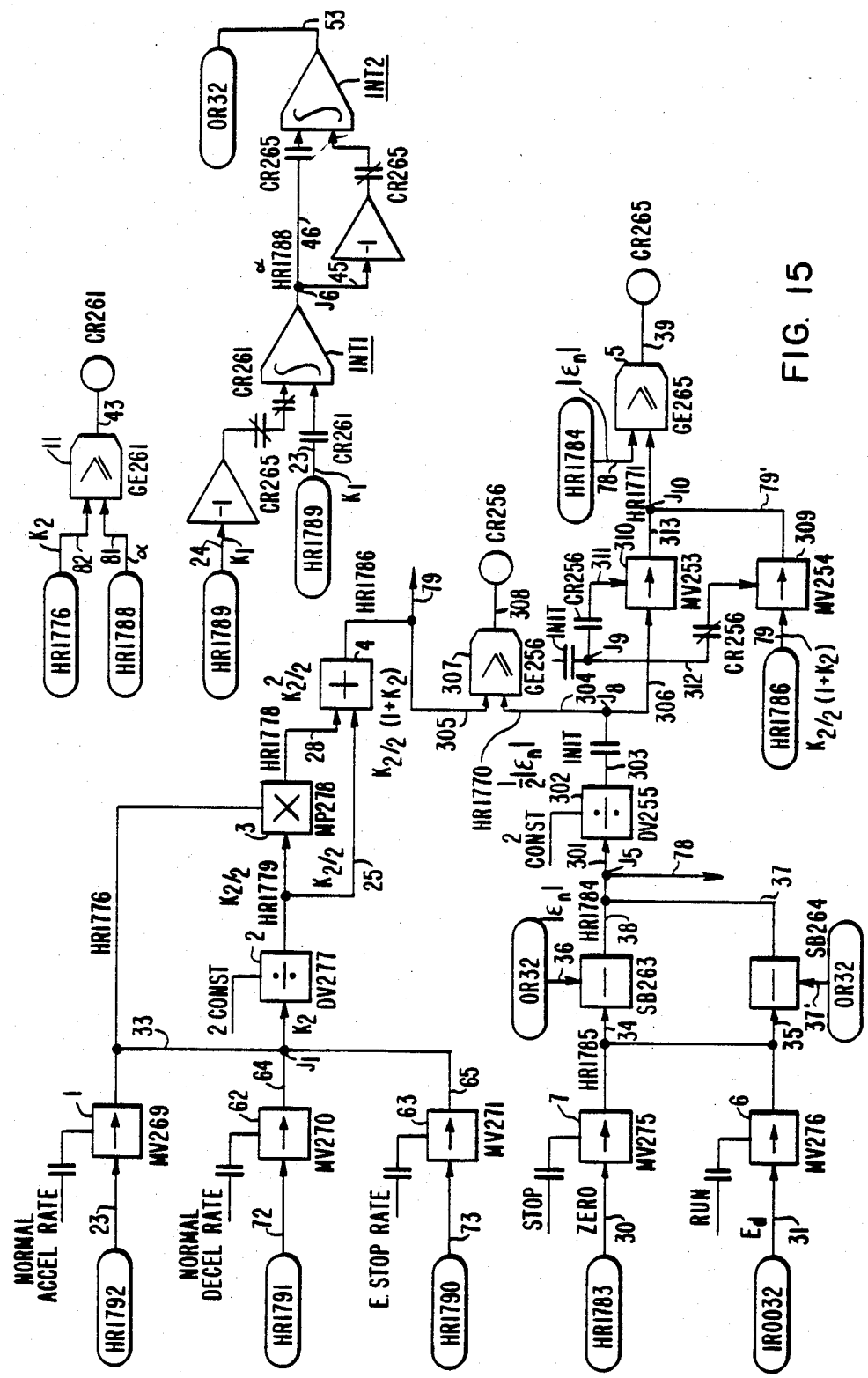
FIG. 15 is a modification of the block diagram of FIG. 11 to implement the modes of operation of FIG. 14.

Referring to FIG. 15, portions common to FIG. 11 are indicated with the same reference numerals. Integrators INT1, INT2 are symbolized as such for the sake of clarity at the upper right of FIG. 15, and the three selectable ramp rates are inputted from lines 23, 72, and 73, respectively at the upper left of FIG. 15. The absolute error $|\epsilon|$ of line 79 (HR1786) is carried onto comparator 5 through a move function MV254 (block 309) and via line 79' to junction $J_{10}$. The absolute error $|\epsilon|$ from junction $J_5$, via line 301, is divided by 2 by divide function DV255 (block 302) to derive $|\epsilon|/2$. The half-error at junction $J_8$ is initially received at junction $J_8$ (HR1770) when contacts INT are closed. It is compared on line 304 to the contouring distance $\frac{1}{2}(k_2+1)$ of HR1786 received from line 305. A comparator GE256 (block 307) controls by relay CR256 a move function MV253 connecting $J_8$ and line 306 to line 313 and junction $J_{10}$. As a result, should the initial half error $|\epsilon|/2$ appear to be less than $\frac{1}{2}(1+k_2)$ at 307 and 308, the system knows that a straight ramp (AB on FIG. 12) cannot be generated before initiating the third segment (BC on FIG. 12). Therefore, the move function MV253 allows the half-error $|\epsilon|/2$ to be used as a limit rather than the amount $k_2/2(k_2+1)$ (move function MV254, having its contacts 256 opened, is blocked). When at block 5 the instantaneous value $|\epsilon|$ of HR1784 reaches $|\epsilon|/2$, it is time to end the initial contouring (0A' in FIG. 14) and start the final contouring (B'C' in FIG. 14). This is effected by relay CR265 inversing the roles at the input of INT 1. This also means that only two partial contouring will be effected successively, as illustrated by curve 0A'B'C'.

The other possibility is that, when comparator 307 does not activate relay CR256, and move function MV254 is operative, the absolute error $|\epsilon|$ on line 79 and 79' is equal to or larger than the amount $k_2/2(k_2+1)$. In such case comparator 5 works as explained by reference to FIG. 11. This operation includes, depending upon the size of the error on line 78, either a ramp AB being built up after the first contouring, or no straight ramp at all, like shown by curve 0ABC of FIG. 14, if the error $|\epsilon|$ of line 78 is equal to the limit of line 70 right at the end of the initial contouring. Then, final contouring by an inversion of INT1 occurs under relay CR256 from line 9 immediately and integrator INT2 never operates alone.

A typical application of the ramp function generator according to the invention would be with a system like shown by U.S. Pat. No. 3,657,623. The invention will now be described, for the sake of illustration, in the context of a rolling line for aluminum foil processing.

Figure 16:
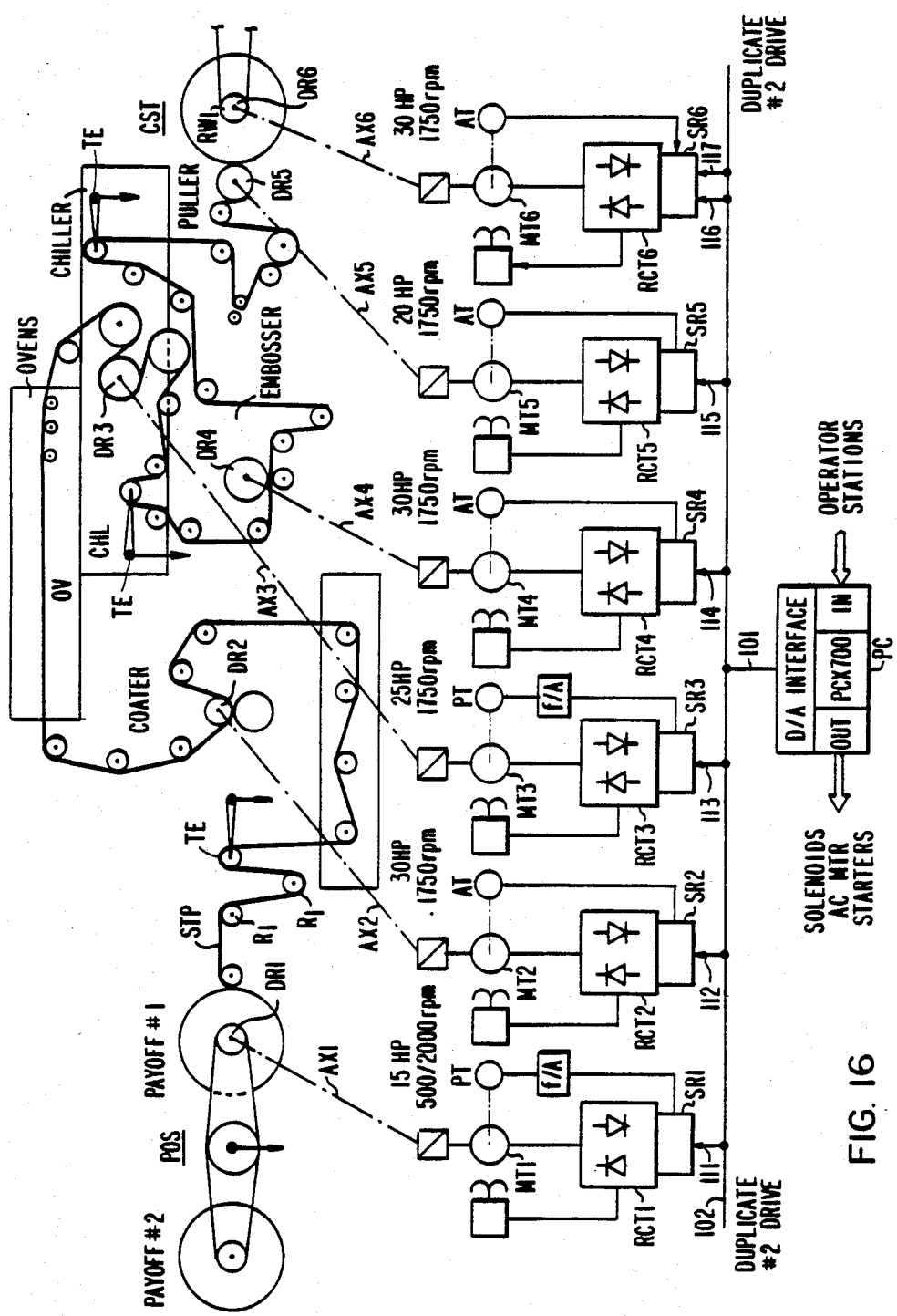
FIG. 16 is a block diagram showing the programmable controller of FIGS. 11, 13A–13E and 15 inserted in the speed controller of a reel drive system.

Referring to FIG. 16, a strip of aluminum foil STP is continuously passed between a series of rolls such as $R_1$ which belong to a tensor distributing evenly the tension as the strip leaves a pay-off station POS and reaches a coiling station CST.

Driving of the strip STP is effected at six points by driving rolls ($DR_1$-$DR_6$) which have to be driven along axes ($AX_1$-$AX_6$) at speeds determined by DC motors ($MT_1$-$MT_6$). These are part of a plurality of motor drives responding to a master reference signal and to individual speed control regulators ($SR_1$-$SR_6$) establishing instantaneously a precise speed relationship from one roll $DR_1$-$DR_6$ to the next.

Several tests have to be performed by the control system of FIG. 16: (1) ensure an accurate determination of the diameter of the pay-off coil on the pay-off wheel $PO_1$ in service; (2) to control the speed of the pay-off coil as a function of encoding e.g. of coil diameter; (3) to control the speeds of all the coils DR1-DR6 in a proper speed relationship according to mass flow in a linear fashion through individual ramp functions as determined by the operator at the processing station in order to adjust the speed globally throughout the system; (4) to automatically establish inertia compensation as a function of the mass of metal on either the pay-off wheel $PO_1$ or the rewind wheel $RW_1$ at the coiling station ST; and (5) to effect such monitoring, control and adjustments with the assist of an operator for a plurality of parallel processing lines, such as the one shown in FIG. 26 (one parallel processing line not shown but identified as duplicate drive #2) via lines 102, 103 extending from a pay-off wheel to a rewind wheel respectively, at a pay-off station and at a coiling station.

More specifically, the aluminum foil strip STP is passed between rolls $R_1$ from the pay-off coil $PO_1$ through a tension equalizer TE, then, brought at the proper angle into a coater roll section driven by a driving roll DR2, then passed through an oven OV. The strip is driven by a driving roll DR3 disposed within a chiller CHL. From there it goes to an embosser EMB having a driving roll DR4 and is supplied by a driving roll DR5 to the rewind coil RW₁, itself driven by a driving roll DR6. Tension equalizers TE are properly staged at the two ends of the chiller section.

The motor drives are conventional. A rectifier section (RCT₁, ... RCT₆) supplies armature current to a DC motor (MT₁–MT₆). Each motor has a separate field excitation and a pilot tachometer controlling the speed regulator associated with the rectifier section. Depending upon their particular function along the process line, the motor drives have some different characteristics. Typically, motor MT₁ which drives the pay-off wheel is a 15 HP motor having a speed varying between 500 and 2000 RPM. Motor MT₂ driving the coater roll is a 30 HP motor of base speed 1750 RPM. Motor MT₃ is a 25 HP motor of base speed 1750 RPM. For the embosser, the motor MT₄ has 30 HP and 1750 RPM. The puller motor MT₅ has 20 HP and 1750 RPM. The winder motor MT₆ is a 30 HP and 1750 RPM motor.

All these motors are operating in parallel controlled via lines 111 to 117 in accordance with a master reference speed. For any change in the master reference control signal from line 101, each individual motor speed along the process line should receive a distributed amount of change, and this can be done in parallel from one process line (such as shown) to another (like duplicate drive #2 not shown), simultaneously or individually. To this effect, according to the present invention, a digital programmable controller PC is provided responding to the operator's programming instructions and the process output signals via an input section ISC and generating between the input section and an output section OSC the prescribed command input signals on lines 101 and 111–117 to the individual motor drive regulators. The programmable controller PC, and the associated input and output sections are preferably of the NUMA-LOGIC (a Westinghouse trademark) type, e.g., a small compact, microprocessor-based programmable controller of rugged and low-cost construction, easy to operate from an unskilled programmer's point of view.

In accordance with the present invention, such simple and known programmable controller system has been modified and improved in order to provide sophisticated functions for automatic control and monitoring of a motor drive system such as the one illustrated by FIG. 16.

From the explanations given regarding FIGS. 11 and 15, it appears that the programmable controller permits an operator who is not knowledgeable in computer software, to effectively control the speed of the system so as to choose a ramp rate, to increase or decrease speed, to automatically reach a preset level of speed, to start or stop the motor drive. Moreover, the programmable controller exercises automatically all the prescribed routines of coasting to the set point speed reference, of emergency stop, of holding the assigned speed reference. All this is effected while taking advantage of the inherent stability of the controller in fixing values which are precise and free of drift.

What we claim is:

1. A method of controlling an adaptive control system through a ramp function generator generating a signal from an initial level to a final level comprising the steps of:

establishing a set-point analog reference signal corresponding to said final level;
converting said set-point analog reference signal into a digital reference signal;
generating an instantaneous ramp digital signal by adding a selected digital increment ($k_2$) during successive elementary time intervals (T);
initially building up said ramp digital signal by increasing the increment from zero to $k_2$ according to an arithmetic progression of root $k_1 = 1$ during $N_1$ successive said time intervals T;
comparing said ramp digital signal to said reference digital signal to derive an error signal;
decreasing said increment $k_2$ down to zero during $N_1$ successive elementary time intervals in accordance with an arithmetic progession of root $k_1$;
said increment decreasing steps being initiated when said error signal is equal to $\frac{1}{2}k_2(k_2+1)$;
converting said ramp digital signal into an analog output signal; and
applying said analog output signal to said adaptive control system;
whereby upon completion of said $N_1$ decreasing steps said ramp output signal automatically reaches said final level.

2. In a DC motor drive system controlled by a speed control signal to assume a corresponding motor speed, with a ramp function generator being provided responsive to a speed reference signal related to an assigned motor speed for generating a corresponding control signal;

said ramp function generator being operative in relation to a change in said speed reference signal from an initial to a final value thereof for providing an instantaneous signal therebetween;
the combination of:
programmable controller means for selecting a rate $k_2$ for said ramp function generator;
first means associated with said ramp function generator for increasing the rate thereof in accordance with an arithmetic progression of root $k_1 = 1$;
second means associated with said ramp function generator for decreasing the rate thereof in accordance with an arithmetic progression of root $k_1 = 1$;
comparator means being provided responsive to said final and to said instantaneous values for providing an error signal representing the want in magnitude of said instantaneous ramp signal from said final value;
said first means beeing actuated by said error, whereby said first means is initiated when said speed reference is changed from said initial to said final value; said first means being deactivated when said rate has reached $k_2$;
said second means being initiated when said error signal is equal to $\frac{1}{2}k_2(k_2+1)$ whereby said second means brings said instantaneous ramp signal to said final value when the rate of said ramp function generator has been reduced to zero.

3. The DC motor drive of claim 2 with means for detecting the sign of said speed reference signal change; said ramp function generator generating a ramp signal of slope in accordance with said sign.

4. The DC motor drive of claim 2 with said first means and second means forming a first integrator of rate $k_1 = 1$; a second integrator of rate $k_2$ being provided mounted in cascade after said first integrator, whereby the rate of said second integrator is determined by said first integrator; said first integrator being stopped when said first means is being terminated, said ramp function generator being responsive to said second integrator, whereby said ramp function generator is operating with said $k_2$ rate through said second integrator in the absence of said first integrator.

* * * * *